(12) United States Patent (10) Patent No.: US 9,392,177 B2
Takasumi et al. (45) Date of Patent: Jul. 12, 2016

(54) IMAGE PROCESSING DEVICE, IMAGING DEVICE AND IMAGE PROCESSING METHOD CAPABLE OF ADJUSTING COLOR OF AN IMAGE

(71) Applicant: Olympus Corporation, Shibuya-ku, Tokyo (JP)

(72) Inventors: Shinya Takasumi, Akiruno (JP); Hirozumi Arai, Machida (JP); Izumi Sakuma, Tokyo (JP); Maki Kawakami, Tokyo (JP); Keiji Okada, Hino (JP); Kensei Ito, Sagamihara (JP)

(73) Assignee: Olympus Corporation, Tokyo (JP)

( * ) Notice: Subject to any disclaimer, the term of this patent is extended or adjusted under 35 U.S.C. 154(b) by 21 days.

(21) Appl. No.: 14/323,999

(22) Filed: Jul. 3, 2014

(65) Prior Publication Data

US 2015/0009360 A1 Jan. 8, 2015

(30) Foreign Application Priority Data

Jul. 4, 2013 (JP) ................................. 2013-140806

(51) Int. Cl.
*H04N 5/232* (2006.01)
*H04N 9/64* (2006.01)
*H04N 9/73* (2006.01)

(52) U.S. Cl.
CPC ....... *H04N 5/23293* (2013.01); *H04N 5/23216* (2013.01); *H04N 5/23229* (2013.01); *H04N 9/643* (2013.01); *H04N 9/735* (2013.01)

(58) Field of Classification Search
None
See application file for complete search history.

(56) References Cited

U.S. PATENT DOCUMENTS

| | | | | |
|---|---|---|---|---|
| 2007/0247475 A1* | 10/2007 | Pettigrew | ................. | G09G 5/06 345/594 |
| 2007/0247647 A1* | 10/2007 | Pettigrew | .............. | G06T 11/001 358/1.9 |
| 2007/0247679 A1* | 10/2007 | Pettigrew | ............... | H04N 1/622 358/518 |
| 2009/0110273 A1* | 4/2009 | Shinoda | ................. | G06T 5/009 382/165 |
| 2012/0019550 A1* | 1/2012 | Pettigrew | .............. | G06T 7/0081 345/594 |
| 2012/0019551 A1* | 1/2012 | Pettigrew | ................. | H04N 9/75 345/594 |
| 2012/0194710 A1 | 8/2012 | Takano | | |
| 2013/0286040 A1* | 10/2013 | Kawaguchi | .............. | G09G 5/06 345/601 |
| 2014/0176773 A1* | 6/2014 | Sakuma | ............. | H04N 5/23293 348/333.02 |

FOREIGN PATENT DOCUMENTS

JP 2004-072168 3/2004

* cited by examiner

*Primary Examiner* — Justin P Misleh
(74) *Attorney, Agent, or Firm* — John C. Pokotylo; Straub & Pokotylo

(57) ABSTRACT

An image processing device of the present invention comprises a designation section for designating an adjustment amount using a first adjustment axis for carrying out first adjustment to adjust so as to displace white balance of image data in a hue direction that has been designated by the user, and a second adjustment axis for carrying out second adjustment to adjust saturation of the image data that has had white balance adjusted by the first adjustment axis, an image processing section for applying first image processing corresponding to the first adjustment to the image data, and applying second image processing corresponding to the second adjustment to the image data that has been subjected to the first image processing, wherein the image processing section changes the second image processing depending on the first image processing.

11 Claims, 9 Drawing Sheets

FIG. 6A
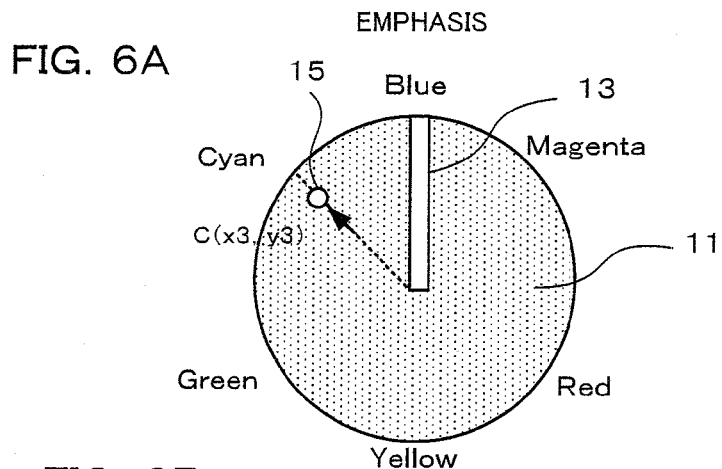
FIG. 6B
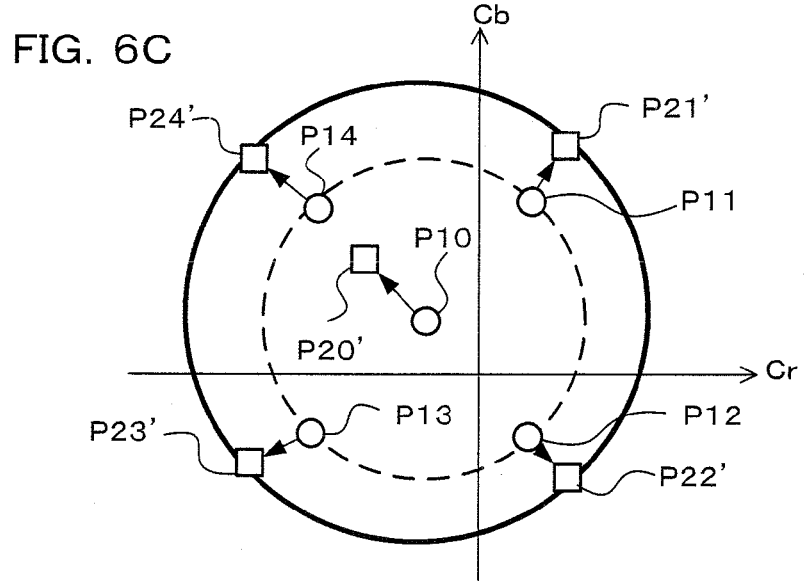
FIG. 6C

FIG. 8
|  | Rgain | Bgain |
|---|---|---|
| AWB | 2.5 | 1.5 |
| ↓ | | |
| CYAN DIRECTION (ADJUSTMENT AXIS 2) | 2.0 | 1.6 |
| ↓ | | |
| SATURATION EMPHASIS (ADJUSTMENT AXIS 2) | 1.7 | 1.6 |
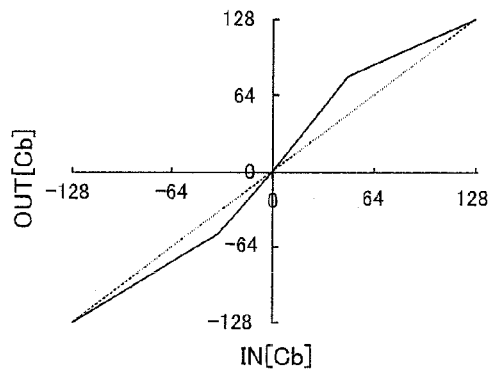
FIG. 9A
AT THE TIME OF CYAN DIRECTION SATURATION EMPHASIS
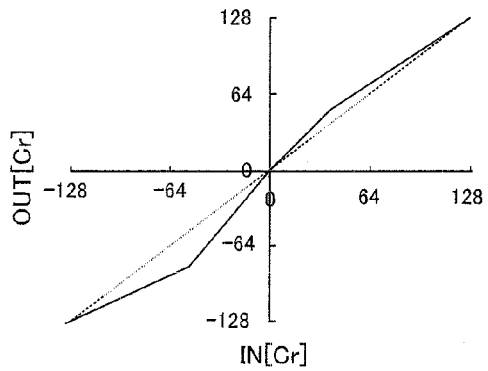
FIG. 9B
AT THE TIME OF CYAN DIRECTION SATURATION EMPHASIS
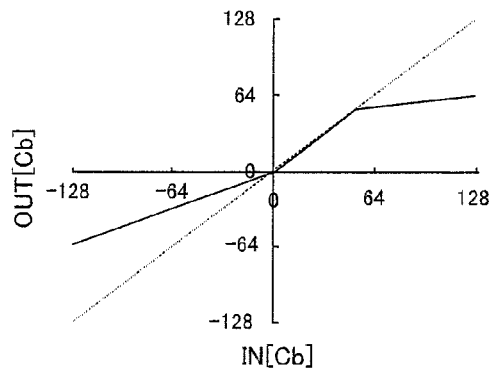
FIG. 9C
AT THE TIME OF CYAN DIRECTION SATURATION SUPPRESSION
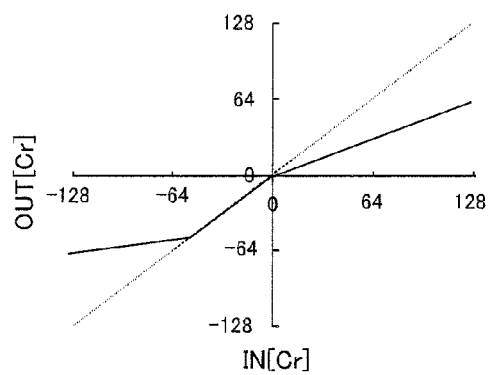
FIG. 9D
AT THE TIME OF CYAN DIRECTION SATURATION SUPPRESSION

IMAGE PROCESSING DEVICE, IMAGING DEVICE AND IMAGE PROCESSING METHOD CAPABLE OF ADJUSTING COLOR OF AN IMAGE

Benefit is claimed, under 35 U.S.C. §119, to the filing date of prior Japanese Patent Application No. 2013-140806 filed on Jul. 4, 2013. This application is expressly incorporated herein by reference. The scope of the present invention is not limited to any requirements of the specific embodiments described in the application.

BACKGROUND OF THE INVENTION

1. Field of the Invention

The present invention relates to an image processing device capable of adjusting color of an image, such as hue and saturation etc., and to an imaging device and an image processing method.

2. Description of the Related Art

A photograph is means to record a subject, and also means for a photographer to express themselves. When expressing oneself with a photograph, expression of color is one important factor. With recent digital cameras, functions to adjust color, such as a saturation adjustment function, white balance adjustment function etc. are provided, and a user carries out photo shooting aimed at creative color representation by utilizing these functions. However, since these adjustment functions are independent functions aimed at respective objectives, in the case of carrying out creative color representation they are not functions that are intuitively easy to use.

For example, in the case where the user wants to impart a color cast to an image, and strengthen the impression of that color, if an operation such as a white balance function or saturation etc. is performed it is intuitively difficult to ascertain if the desired color has been achieved. Japanese Patent laid-open No. 2012-160958 (patent publication 1) discloses technology for combining two functions on a single image, and improving usability.

In carrying out creative color representation, in the case where ordinary white balance adjustment function or saturation adjustment function are used, besides the problem that operation is not intuitive, there are situations where desired color representation can not be achieved even with these adjustment using these types of functions. Specifically, in a case here a plurality of colors that have a complementary color relationship are mixed within an image, with a view to strengthening impression of an imparted color after an arbitrary color cast is imparted, saturation emphasis is carried out by saturation adjustment after imparting color by white balance adjustment. In this case, since color in a direction different to that of the color cast is also subjected to saturation emphasis, the impression of the color cast may be different to that intended by the user, and the impression of the color cast may be lost.

Also, with a view to mellowing color of an image overall while maintaining impression of a color cast, if a color cast is imparted by white balance adjustment and adjustment to suppress saturation is carried out, impression of the color cast fades. In patent publication 1 it is disclosed that a plurality of functions are combined, but there is no mention of carrying out creative color representation in line with a user's intentions.

SUMMARY OF TEE INVENTION

An object of the present invention is to provide an image processing device, an imaging device and an image processing method suitable for carrying out creative color representation in line with a user's intentions An image processing device of the present invention comprises a designation section for designating adjustment amounts, using a first adjustment axis for carrying out first adjustment of adjusting image data so as to displace white balance in a hue direction a user has specified, and a second adjustment axis for carrying out second adjustment to adjust saturation of image data that has had white balance adjusted by the first adjustment axis, and an image processing section for applying first image processing corresponding to the first adjustment on the image data, and applying second image processing corresponding to the second adjustment to the image data that has been subjected to the first image processing, wherein the image processing section changes the second image processing in accordance with the first image processing.

An imaging device of the present invention comprises an imaging section for forming a subject image and obtaining image data, a monitor for displaying the image data, a designation section for designating adjustment amounts, using a first adjustment axis for carrying out first adjustment of adjusting image data so as to displace white balance in a hue direction a user has specified, and a second adjustment axis for carrying out second adjustment to adjust saturation of image data that has had white balance adjusted by the first adjustment axis, and an image processing section for applying first image processing corresponding to the first adjustment to the image data, and applying second image processing corresponding to the second adjustment to the image data that has been subjected to the first image processing, wherein the image processing section changes the second image processing in accordance with the first image processing.

An image processing method of the present invention, for adjusting hue and saturation, comprises a step of designating adjustment amounts, using a first adjustment axis for carrying out first adjustment of adjusting image data so as to displace white balance in a hue direction a user has specified, and using a second adjustment axis for carrying out second adjustment to adjust saturation of image data that has had white balance adjusted by the first adjustment axis, a step of applying first image processing corresponding to the first adjustment to the image data, and a step of applying second image processing, corresponding to the second adjustment, to image data that has been subjected to the first image processing, and changing the second image processing in accordance with the first image processing.

BRIEF DESCRIPTION OF THE DRAWINGS

FIG. 6A to FIG. 6C are drawings showing an example of adjusting saturation in the hue and saturation adjustment, with the camera of one embodiment of the present invention.

FIG. 8 is a table showing an example of adjustment of white balance gain, with the camera of one embodiment of the present invention.

FIG. 9A to FIG. 9D are graphs showing modified examples of a color difference signal, with the camera of one embodiment of the present invention.

DETAILED DESCRIPTION OF THE PREFERRED EMBODIMENTS

Preferred embodiments using a camera to which the present invention has been applied will be described in the following in accordance with the drawings. A camera of one preferred embodiment of the present invention is a digital camera, and has an imaging section (image sensor 102), with a subject image being converted to image data by this imaging section, and the subject image then being subjected to live view display on a display section (LCD 116 etc.) arranged on a rear surface of a body based on this converted image data. A photographer determines composition and photo opportunity by looking at the live view display. At the time of a release operation image data is stored in a storage medium. Image data that has been stored in the storage medium 115 can be played back and displayed on the display section if playback mode is selected.

Figure 3:
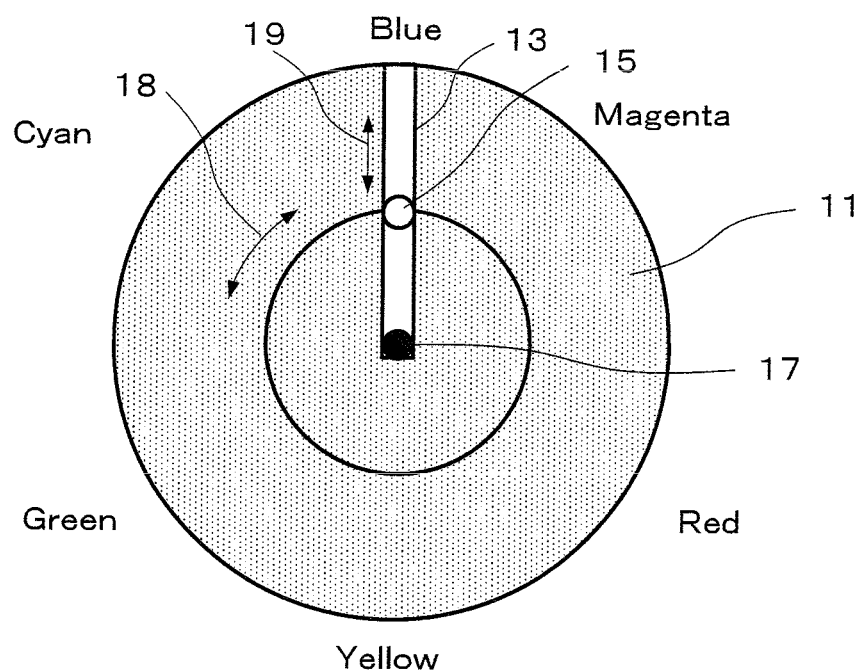
FIG. 3 is a drawing showing an example of an operation section UI (user interface) for hue and saturation adjustment, in the camera of one embodiment of the present invention.

Also, in the case where hue and saturation adjustment is carried out for image data that will be used for live view display or playback display, the user may designate a cursor (hue and saturation designation pointer 15) position on the operation section UI (user interface) displayed on the display section (refer to FIG. 3). A first adjustment axis (circumferential direction in the example shown in FIG. 3) for carrying out first adjustment to adjust white balance so as to be displaced in a hue direction designated by a user, and a second adjustment axis (radial direction in the example shown in FIG. 3) for carrying out the second adjustment to adjust saturation of image data that has been subjected to white balance correction on the first adjustment axis, are displayed on this operation section UI. The image processing section applies first image processing corresponding to first adjustment to the image data, applies second image processing corresponding to a second adjustment to image data that has been subjected to this first image processing, and changes the second image processing depending on the first image processing.

Figure 1:
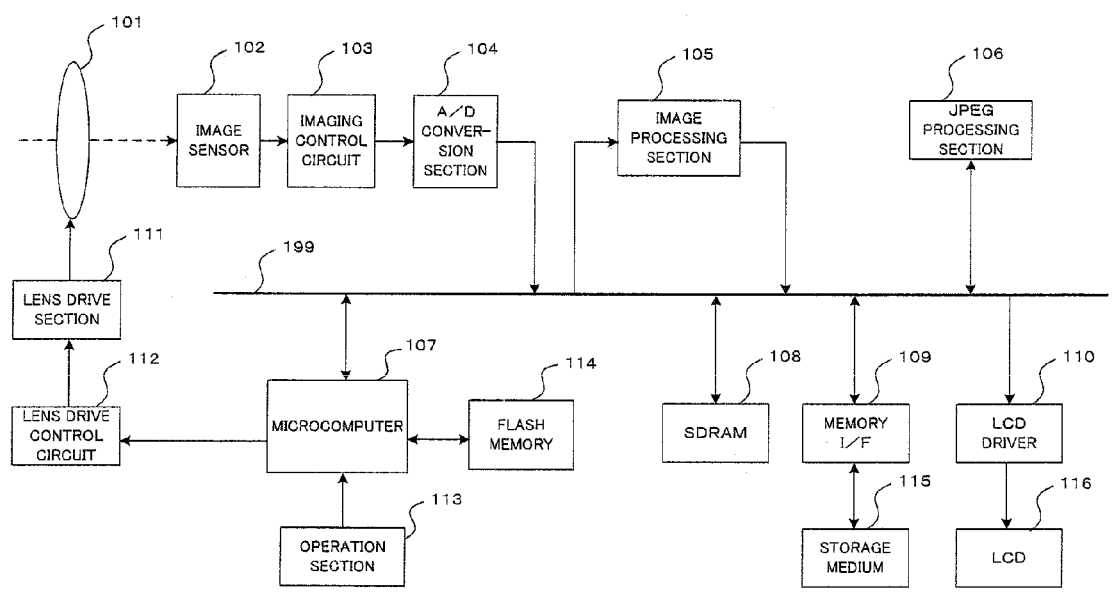
FIG. 1 is a block diagram mainly showing the electrical structure of a camera of one embodiment of the present invention.

FIG. 1 is a block diagram mainly showing the electrical structure of a camera of one embodiment of the present invention. The photographing lens 101 is constituted by a plurality of optical lenses for forming a subject image, and is a fixed focal length lens or a zoom lens. The photographing lens 101 is capable of being moved in an optical axis direction by a lens drive section 111, with focus position of the photographing lens 101 being controlled on the basis of a control signal from a lens drive control section 112, and focal length also being controlled in the case of a zoom lens. A lens drive control circuit 112 carries out drive control of the lens drive section 111 in accordance with control commands from a microcomputer 107.

An image sensor 102 is arranged on the optical axis of the photographing lens 101, close to a position were a subject image is formed by the photographing lens 101. The image sensor 102 functions as an imaging section for acquiring image data by forming a subject image. Photo diodes constituting each pixel are arranged on the image sensor 102 in a two dimensional matrix shape. Each photodiode generates photoelectric conversion current in accordance with received light amount, and this photoelectric conversion current is the subject of charge storage by a capacitor connected to each photodiode. A Bayer array RGB filter is arranged on the front surface of each pixel.

The image sensor 102 is connected to an imaging circuit 103, this imaging circuit 103 carries out charge accumulation control and image signal read out control of the image sensor 102, carries out waveform shaping after reduction of reset noise etc. on the read out image signal (analog image signal), and also carries out gain increase to bring up to an appropriate signal level.

This imaging circuit 103 is connected to an A/D conversion section 104, and this A/D conversion section 104 performs analog to digital conversion on the analog image signals, and outputs the digital image signals (hereafter referred to as image data) to a bus 199.

The bus 199 is a transfer path for transferring various data, that has been read out or generated inside the camera. Besides the above described A/D conversion section 104, the image processing section 105, JPEG processing section 106, microcomputer 107, SDRAM (Synchronous DRAM) 108, memory interface (hereafter referred to as memory I/F) 109, and LCD (liquid crystal display) driver 110 are connected to the bus 199.

The image processing section 105 carries out various image processing, such as OB subtraction processing, white balance adjustment, color matrix computation, gamma conversion, color difference signal processing, noise removal processing, demosaicing processing, edge processing etc. on the image data, on the basis of output of the image sensor 102. Details of this image processing section 105 will be described later using FIG. 2.

The JPEG processing section 106 subjects image data that has been read out from the SDRAM 108 to compression in accordance with the JPEG compression method, at the time of storing image data in the storage medium 115. The JPEG processing section 106 also carries out expansion of JPEG image data for image playback display. With expansion, a file that has been stored in the storage medium 115 is read out, and after being subjected to expansion processing in the JPEG processing section 106, the expanded image data is temporarily stored in the SDRAM 108 and displayed on the LCD 116. With this embodiment, the JPEG format has been adopted as an image compression and expansion method, but the compression and expansion method is not limited to this, and other compressions and expansion methods may also be adopted, such as MPEG, TIFF, H.264 etc.

The microcomputer 107 provides a function as a control section for this entire camera, and performs overall control of various sequences of the camera. An operation section 113 and a flash memory 114 are connected to the microcomputer 107.

The operation section 113 includes operation members such as various input buttons, like a power supply button, release button, a movie button, playback button, menu button, cross-shaped key, OK button, delete button, magnification button, and various input keys, and detects operating states of these operation members and outputs the result of detection to the microcomputer 107. Also, a touch panel is provided on the front surface of the LCD 116, as a display section, a user's touch position is detected, and this touch position is output to the microcomputer 107. The microcomputer 107 executes various sequences according to user operation based on the result of detection of the operation members from the operation section 113.

The flash memory 114 stores a program for executing the various sequences of the microcomputer 107. The microcomputer 107 carries out overall control of the camera based on this program. The flash memory 114 also stores various adjustment values of the camera, and the microcomputer 107 reads out adjustment values and carries out control of the camera in accordance with the adjustment values.

The SDRAM 108 is an electrically rewritable volatile memory for temporary storage of image data etc. This SDRAM 108 temporarily stores image data that has been output from the A/D conversion section 104, and image data that has been processed in the image processing section 105, JPEG processing section 106 etc.

The memory I/F 109 is connected to the storage medium 115, and carries out control for reading and writing of data, such as image data and headers attached to image data, to and from the storage medium 115. The storage medium 115 is a storage medium such as a memory card that can be loaded into and taken out of the camera body, for example, but this is not limiting and it may also be a hard disk or the like built into the camera body.

The LCD driver 110 is connected to the LCD 116, displays images etc. on the LCD 116 based on image data that has been read out from the SDRAM 108 and the storage medium 115, and has been expanded by the JPEG processing section 106. The LCD 116 is arranged on the rear surface or the like of the camera body, and performs image display. A touch panel for detecting a user's touch operation is provided on this LCD 116. With this embodiment, a liquid crystal display panel (LCD 116) is arranged as a display section, but this is not limiting and various display panels may be adopted, such as organic EL etc.

As image display for the LCD 116, there are Quickview Display for displaying images based on stored image data for only a short time, playback display of image files for still images and movies that have been stored in the storage medium 115, and movie display such as live view display. It is also possible to display an operation section UI for hue and saturation adjustment, superimposed on the live view display wall playback display. This operation section UI will be described later using FIG. 3.

Figure 2:
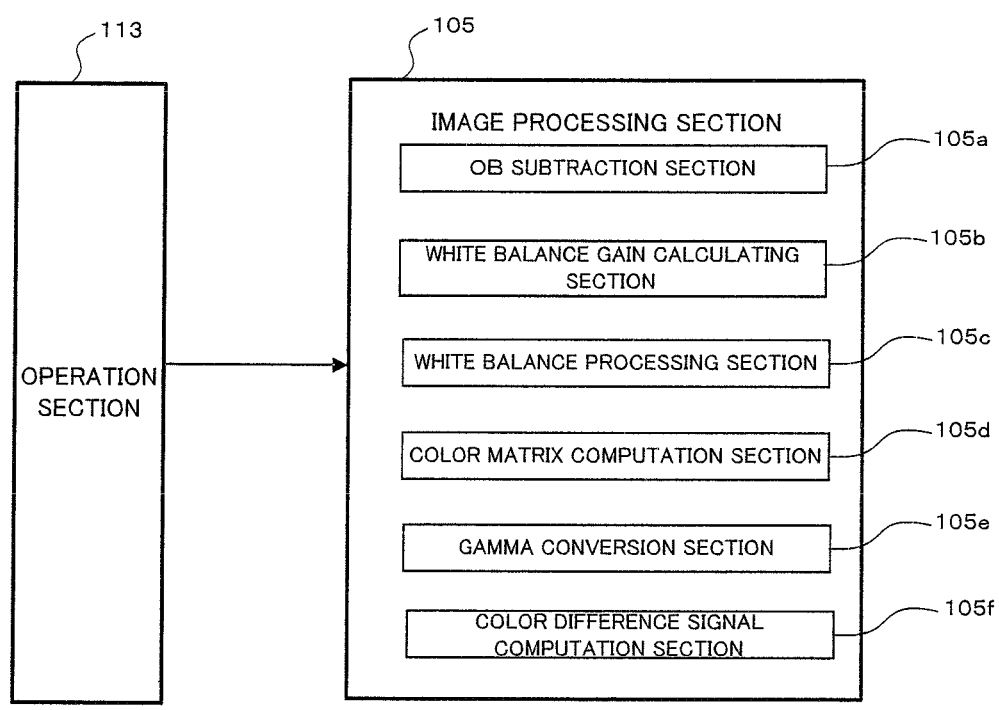
FIG. 2 is a block diagram showing detail of an image processing section of a camera of one embodiment of the present invention.

Next, details of the image processing section 105 will be described using FIG. 2. The image processing section 105 internally includes an OB (optical black) subtraction section 105a, a white balance gain calculation section 105b, a white balance processing section 105c, a color matrix calculating section 105d, gamma conversion section 105e, and a color difference signal calculating section 105f.

The OB subtraction section 105a subtracts data that is equivalent to dark current noise arising in the image sensor 102 from image data. The white balance gain calculation section 105b calculates gain for color signals for each of RGB in order to correctly reflect white color in an image in a white color as would be perceived by a person when actually viewed, under various color temperature light sources. The white balance processing section 105c uses gain for each color signal that has been calculated by the white balance gain calculation section 105b to multiply each color signal of RGB by a gain.

The white balance gain calculation section 105b carries out auto white balance calculation. In order to perform auto white balance calculation, the white balance gain calculation section 105b has a first white balance calculation section for calculating a first white balance gain to suit a light source color, a second white balance calculation section for calculating a white balance adjustment coefficient in accordance with adjustment position of a first adjustment axis 18 (refer to FIG. 3), and a third white balance calculating section for multiplying the first white balance gain by the white balance adjustment coefficient.

The color matrix calculating section 105d converts color signals signal obtained from the image sensor 102 to RGB signals, as colors perceived by a person, by subjecting RGB signals that have been processed by the white balance processing section 105c to matrix computation. The gamma conversion section 105e subjects RGB signals output from the color matrix calculating section 105d to gamma conversion processing to correct image tone. The color difference signal calculating section 105f subjects output RGB signals of the gamma conversion section 105e to matrix computation to convert to a luminance signal Y and color difference signals Cb and Cr, and carries out color difference calculation in accordance with adjustment position on the first adjustment axis 18 and the second adjustment axis 19.

The image processing section 105, as shown in FIG. 1, is connected by means of the microcomputer 107 and bus 199 to the operation section 113. As will be described later, when carrying out hue and saturation adjustment, the operation section UI for adjustment is displayed on the LCD 116 (refer to FIG. 3), and the user moves a pointer 15 for adjustment of color and hue through touch operation. The image processing section 105 is input with this user instruction, and adjusts white balance gain and color difference signals so as to give a hue and saturation the user desires.

Next, the operation section UI for adjustment of hue and saturation (adjustment UI) will be described using FIG. 3. This adjustment UI is displayed on the LCD 116 superimposed on the live view display or playback display, and the user can carry out instruction of adjustment content for hue and saturation using this adjustment UI.

In FIG. 3, a circular area shown hatched is a hue and saturation adjustment area 11 for adjusting hue and saturation on the basis of the user's operation. On the other hand, a rectangular area within the circular area that is not hatched is a fixed hue adjusted saturation area 13 that includes a point representing saturation and hue that have been automatically adjusted in accordance with the camera (in FIG. 3 the position shown by the pointer 15), and can have saturation adjusted based on this point.

In the hue and saturation adjustment area 11, it is possible to carry out adjustment of hue by adjusting position of the pointer 15 in the circumferential direction, and it is possible to adjust saturation by adjusting the position in the radial direction. Also, in the fixed hue adjusted saturation area 13 it is possible to carry out adjustment of saturation by adjusting position of the pointer 15 in the radial direction.

The hue and saturation designation pointer 15 is capable of being moved to an arbitrary position in the circumferential direction and radial direction of the hue and saturation adjustment area and the fixed hue adjusted saturation area 13. In a state where there has been automatic adjustment by the camera before performing adjustment by the user, the hue and saturation designation pointer 15 is provided at a central portion within the fixed hue adjusted saturation area 13, namely at the position in FIG. 3.

A display example of the GUI of the hue and saturation adjustment area 11 will be described using FIG. 3. It is possible to adjust hue by moving the pointer 15 clockwise in a circumferential direction of FIG. 3 so as to display blue, magenta, red, yellow, green, and cyan. Also, in FIG. 3, display of blue, magenta etc. represents color position. For each color a relationship is such that a substantially opposite position is a complementary color. Further, at the time of drawing, if color display is performed using these colors within the hue and saturation adjustment area 11, it is easy for the operator to ascertain hue intuitively.

Within the hue and saturation adjustment area 11, adjustment of saturation can be carried out by moving the pointer 15 in the radial direction from the center of the circle, and it is possible to change saturation so that saturation increases with proximity to the outer circumference of the circle and decreases with proximity to the center point 17 of the circle, with the center point 17 of the circle constituting an achromatic color. Also, at the time of depicting, if depiction is performed in accordance with saturation in a radial direction within the hue and saturation adjustment area 11, it is easy for the operator to easily grasp saturation.

Next, a display example of the GUI for the fixed hue adjusted saturation area 13 will be described. As shown in FIG. 3, the fixed hue adjusted saturation area 13 is drawn in an achromatic color. Accordingly, it is possible to display the boundary with the hue and saturation adjustment area 11 so that it is easy to understand. In FIG. 3, this area is shown as uniformly white, but a chromatic gradation display is also possible such that the center point 17 is made black, gradually changing to white towards the outer circumference from the center. In this way it is possible for the operator to intuitively grasp the saturation adjustment amount.

Also, in FIG. 3, a circle that is drawn at a substantially central position within the circle represents a position that is equivalent to saturation that has been automatically adjusted by the camera for each color, and is displayed as a reference position for when adjusting saturation. A position on the circumference of this circle will be called a normal position for saturation adjustment, and the position of the hue and saturation designation pointer 15 in FIG. 3 will be called an initial position.

Here, as will be understood from FIG. 3, the hue and saturation adjustment area 11 is different from a general color circle representing continuous hue variation, and at the portion of the fixed hue adjusted saturation area 13 the color circle becomes discontinuous. Regarding this discontinuity, by setting hue so that hue at respective border portions between the hue and saturation adjustment area 11 and the fixed hue adjusted saturation area 13 in the circumferential direction, namely at a border portion on the left side in the radial direction and a border portion on the right side in the radial direction, becomes substantially the same, it is possible to carry out adjustment of hue that is virtually continuous, even if the fixed hue adjusted saturation area 13 partially exists in the circumferential direction.

Also, having the hue and saturation adjustment area 11 and the fixed hue adjusted saturation area 13 arranged within the same area, in either case of adjusting hue and saturation from a value that has been automatically adjusted by the camera, or conversely returning from adjustment of hue and saturation to values that have been automatically adjusted by the camera, it is possible to carry out adjustment simply by moving the hue and saturation designation pointer 15 continuously for either area, without any other operations such as switching operations etc.

The pointer 15 for hue and saturation designation can be moved to positions of hue and saturation to be adjusted by the user performing a touch operation on the touch panel. The image processing section 105 adjusts hue and saturation depending on the position of the hue and saturation designation pointer 15 in either the hue and saturation adjustment area 11 or the fixed hue adjusted saturation area 13.

Also, when moving between the hue and saturation adjustment area 11 and the fixed hue adjusted saturation area 13, movement of the hue and saturation designation pointer 15 may be controlled so as to move seamlessly at the area borders, or may be controlled so that movement is temporarily halted when area borders are reached, in order to notify the operator that the hue and saturation designation pointer 15 has reached an area border.

Figure 4A:
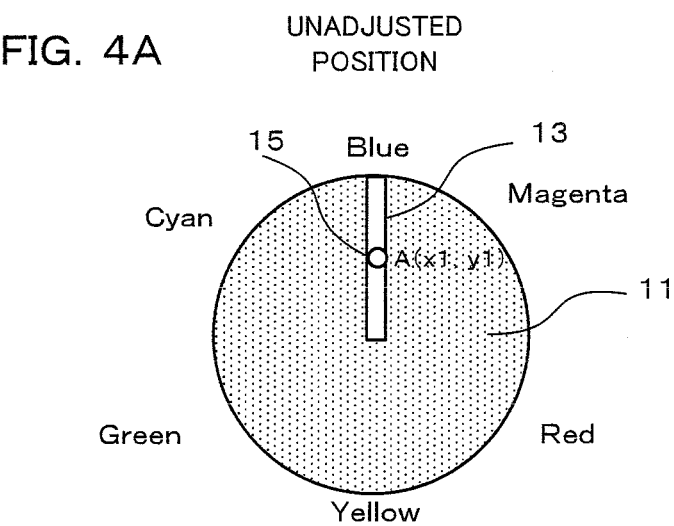
FIG. 4A and FIG. 4B are drawings showing an example of the operation section UI at the time of non-adjustment of hue and saturation adjustment, with the camera of one embodiment of the present invention.
Figure 4B:
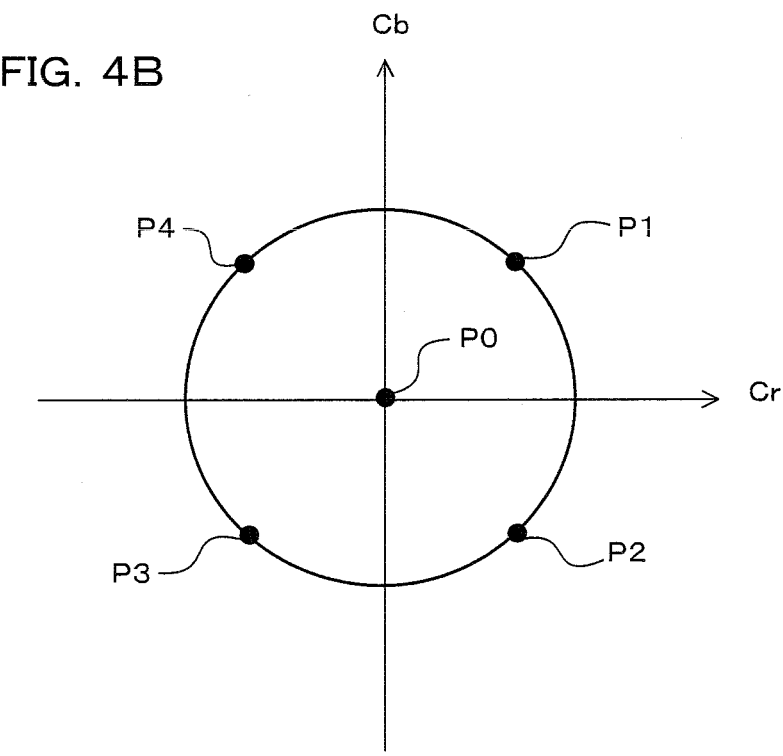

Next, adjustment instruction for hue and saturation will be described using FIG. 4A to FIG. 7C. FIG. 4A shows operating state of the adjustment UI before adjustment of hue and saturation. In this state, the pointer 15 for hue and saturation designation is positioned at A (x1, y1). This is a position that as been automatically adjusted by the camera, and positioned inside the fixed hue adjusted saturation area 13. Also, FIG. 4B shows that the pointer 15 represents hue and saturation in a color difference space when at the position of FIG. 4A, with the horizontal axis representing Cr and the vertical axis representing Cb. Here, the points P1-P4 are points for representative typical color differences.

In this fixed hue adjusted saturation area 13, hue is fixed to a value that has been automatically adjusted by the camera, and adjustment to saturation is possible. For example, in the case where the pointer 15 has been moved in the outer circumference direction of the circle, the position of point P0 in FIG. 4B remains unchanged and points P1-P4 are moved in directions in the color difference space such that respective values increase with point P0 at the center. Also, in the case where the pointer 15 has been moved towards the center of the circle, the position of point P0 in FIG. 4B remains unchanged and points P1-P4 are moved in directions in the color difference space such that respective values decrease with point P0 at the center. Specifically, by carrying out a saturation adjustment operation, the size of a circle that links positions P1-P4 expands or contracts while maintaining a circular shape. In this way, it is possible to change saturation of an image.

Figure 5A:
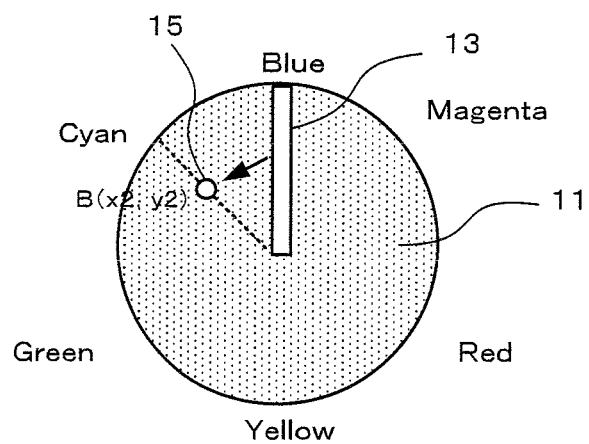
FIG. 5A and FIG. 5B are drawings showing an example of adjusting hue in the hue and saturation adjustment, with the camera of one embodiment of the present invention.

FIG. 5A shows an example where the user rotatably moves the pointer 15 anticlockwise in a circumferential direction, in order to carry out hue adjustment. With this example, hue adjustment is carried out by moving the pointer 15 from position A shown in FIG. 4 (x1, y1) by rotating in the circumferential direction to position B (x2, y2) while the radius of the pointer 15 remains unchanged. If this rotation operation is carried out, saturation of the image does not vary, but hue of the image takes on a cyan color.

Figure 5A:
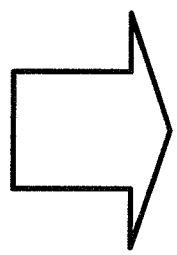
Figure 5B:
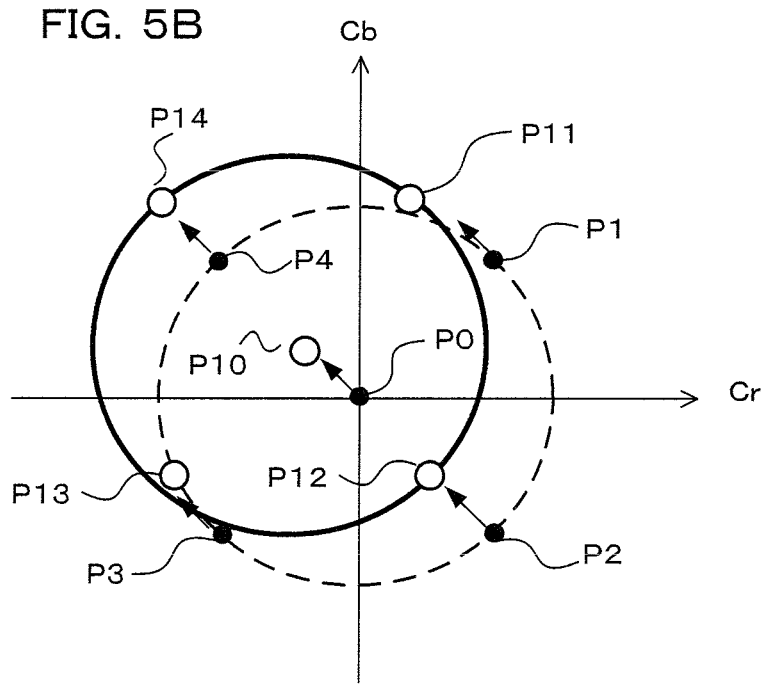

The example of FIG. 5B shows color difference in the color difference space after this rotation operation has been carried out. As will be understood from this drawing, each of the points of positions P0 to P4 are moved to positions P10 to P14 on a substantial circle as a result of the rotation operation, to move overall in the cyan direction. In this manner, if the pointer 15 is moved from position A (x1, y1) within the fixed hue adjusted saturation area 13 that has been automatically adjusted by the camera, without varying saturation, to position B (x2, y2) within the hue and saturation adjustment area 11, on the coordinate system shown in FIG. 5B the point P0 is offset from the axial center in a hue direction, and points P1-P4 are also offset by the same amount in the same direction. Positions P0 to P4 maintain the same relative positional relationship on an offset circle, and so by changing position while rotating about the shaft center hue is made to vary. This first adjustment to vary hue will be described later using FIG. 8.

Next, the hue and saturation emphasis processing will be described using FIG. 6A-FIG. 6C. FIG. 6A shows an example in which the pointer 15 has been moved in a radial direction of the circle to a position towards the outer periphery, in order for the user to emphasize saturation. Specifically, the pointer 15 is moved from position B (x2, y2) shown in FIG. 5A to position C (x3, y3), so position is moved in the radial direction without varying in the circumferential direction. In this way, adjustment is carried out to emphasize saturation without changing hue.

FIG. 6B shows the state of the color difference space after this emphasis operation has been carried out. As will be understood from this drawing, each of the color differences for positions P10-P14 in FIG. 5B are moved to positions P20-P24 with respect to the shaft center of the color space by carrying out the emphasis operation, and a line that links these positions P20-P24 is changed from a circle to a large ellipse. Specifically, by carrying out the saturation emphasis operation, adjustment is performed so that only saturation for a color for which saturation emphasis is desired is emphasized, while maintaining hue. This second adjustment for emphasizing saturation will be described later using FIG. 9A and FIG. 9B.

FIG. 6C shows a case where, compared to the saturation emphasis of FIG. 6B, saturation emphasis is carried out with the same method as was described for FIG. 4A and FIG. 4B, from the hue adjustment state that was described in FIG. 5A and FIG. 5B, with each point of positions P10-P14 being moved in a direction that enlarges a circle with respect to the shaft center of the color different space, to give color differences corresponding to positions P21'-P24'. Compared to the case of FIG. 6B, this results in a dispersed hue. This means that hue that has been adjusted at the first coordinates is not maintained and color may vary. Conversely, with the emphasis processing of this embodiment, as described above, it is possible to carry out adjustment in a direction of emphasizing saturation with the hue kept as it is.

As mentioned above, with the second adjustment for carrying out saturation emphasis, second image processing is carried out so that in a direction to emphasize saturation more than positions P11-P14 of the second adjustment axis 19, an amount of variation in saturation with respect to a normal position becomes largest in a hue direction that has been designated by the user with first adjustment, and becomes smallest in the direction of a color that is a complementary color to the designated hue. Specifically, with the example shown in FIG. 6B, change amount becomes largest in the hue direction for cyan which has been designated by the user, and becomes smallest in the direction of the complementary color (with this example, in the red direction).

Figure 7A:
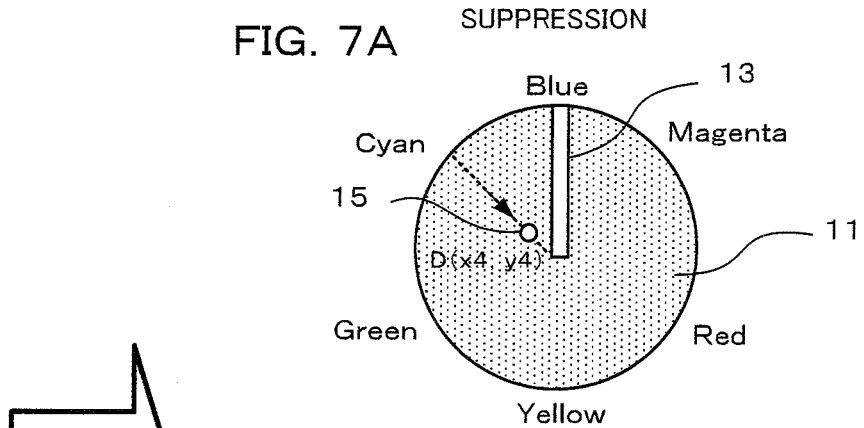
FIG. 7A to FIG. 7C are drawings showing an example of suppressing saturation in the hue and saturation adjustment, with the camera of one embodiment of the present invention.

Saturation suppression processing will be described using FIG. 7A-FIG. 7C. FIG. 7A shows an example where the pointer 15 has been move by the user in a central direction, along the second adjustment axis 19, in order to suppress saturation. With the example shown in FIG. 7A, the pointer 15 is moved from the position of B (x2, y2) shown in FIGS. 5A to D (x4, y4), and only the position of the pointer 15 on the second adjustment axis 19 (specifically, in the radial direction) is changed towards the center without changing the position on the first adjustment axis 18 (specifically, in the circumferential direction). This is adjustment to only lower saturation, without changing hue.

By carrying out this suppression operation it is possible to lower only saturation without changing hue. The example shown in FIG. 7B shows color difference in a color difference space in the case where this suppression operation has been carried out. As will be understood from this drawing, each color difference of positions P10-P14, which are at normal positions, is moved to positions P30-P34 with respect to the rotational center of the color difference space, and a line joining these positions P30-P34 is changed from the circle formed by the line joining positions P10-P14 to a small ellipse. At this time, by making a weighting for position P34 in the hue adjustment direction small, saturation is adjusted in a reducing direction with the hue that has been adjusted kept as it is. This second adjustment for suppressing saturation will be described later using FIG. 9C and FIG. 9D.

Figure 7B:
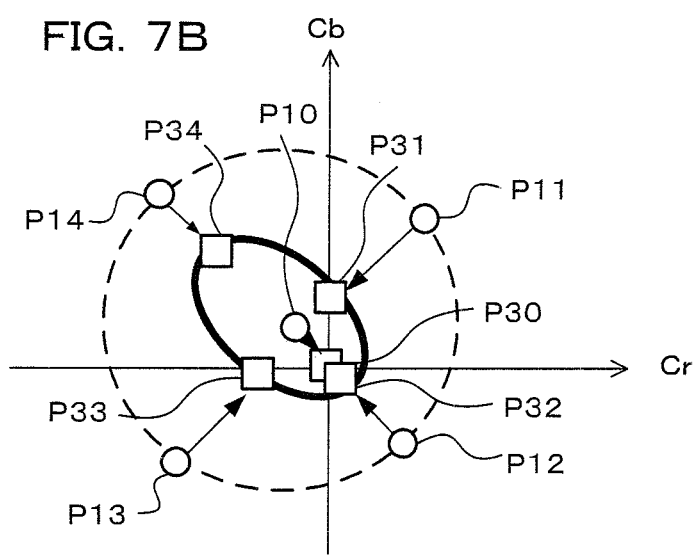
Figure 7C:
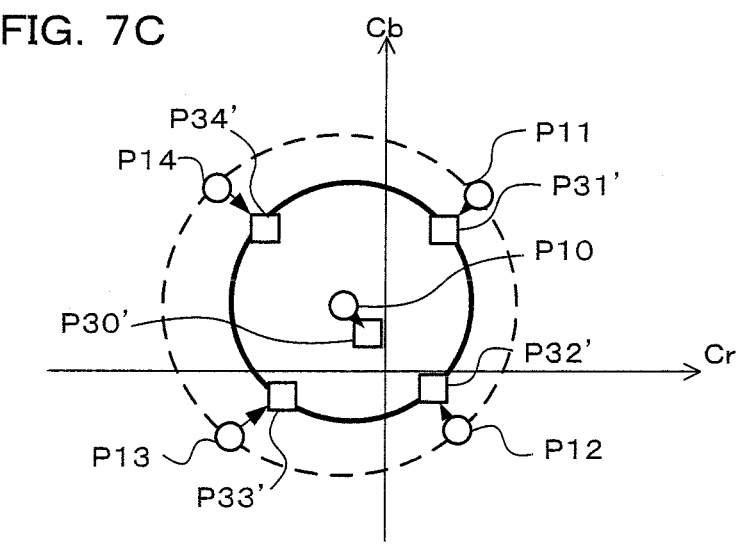

FIG. 7C shows comparison with the saturation emphasis of FIG. 7B, and in the case of carrying out the saturation suppression that was described in FIG. 4A and FIG. 4B from the hue adjustment state that was described in FIG. 5, if the same saturation suppression as was described above is carried out within the fixed hue adjusted saturation area 13, each point of positions P10-P14 is moved in a direction that reduces the size of the circle, with respect to the axial center of the color different space, giving color differences that correspond to positions P31'-P34'. Compared to the case of FIG. 7B, hue is dispersed. This means that hue that has been adjusted to the first coordinates is not maintained and color may vary from that which is intended. Conversely, with the suppression processing of this embodiment, as described above, it is possible to carry out adjustment in a direction of suppressing saturation with the hue kept as it is.

As mentioned above, with the second adjustment for carrying out saturation suppression, second image processing is carried out so that in a direction to suppress saturation more than positions P11-P14 of the second adjustment axis 19, an amount of variation in saturation with respect to a normal position becomes smallest in a hue direction that has been designated by the user with first adjustment. Specifically, with the example shown in FIG. 7, change amount becomes smallest in the hue direction for cyan which has been designated by the user.

Next, image processing for first adjustment to adjust in the hue direction so that white balance is displaced, and second adjustment for adjusting saturation, will be described using FIG. 8 and FIG. 9A-FIG. 9D.

FIG. 8 shows an example of white balance gain in the case where the rotation operation that was illustrated in FIG. 5A and FIG. 5B, namely the operation to adjust hue in the cyan direction, is carried out. In FIG. 8, R gain for auto white balance (AWB) is 2.5, and B gain is 1.5. RGB image data based on output from the image sensor 102 has large G image data based on G pixels, and so in order to reproduce a white color of a subject with the same white color in data, with this example it is necessary to multiply R image data by a gain of 2.5 and multiply B data by a gain of 1.5. For an image that has had auto white balance performed, if R gain and B gain in the cyan direction (first adjustment axis) are made 2.0 and 1.6 respectively, then as a result of the rotation operation shown in FIG. 5, image data is obtained having a tone of the hue designated by the user, namely cyan.

Also, in the case of carrying out the emphasis operation shown in FIG. 6A-FIG. 6C, namely adjustment in a direction to increase saturation, then with the example shown in FIG. 8, if R gain and B again for the saturation emphasis (second adjustment axis) are made 1.7 and 1.6 respectively, image data is acquired that has high saturation for cyan that has been designated by the user on the first adjustment axis.

The above-described change in R gain and B gain is carried out by calculating gain by calculating white balance gain within the image processing section 105, and carrying out multiplication processing to multiply image data by the R gain and B gain in the white balance processing section 105c.

Adjustment of saturation can also be carried out using color difference conversion. FIG. 9A and FIG. 9B show examples of color difference conversion in the case of emphasizing saturation in the cyan direction, with FIG. 9A being a conversion example for color difference (Cb) and FIG. 9B showing a conversion example for color difference (Cr). In the drawings, dotted lines are a conversion example at a normal position where emphasis processing is not carried out, and solid lines show a conversion example for the case where the emphasis operation that was shown in FIG. 6A-FIG. 6C has been carried out.

FIG. 9C and FIG. 9D show examples of color difference conversion in the case of suppressing saturation in the cyan direction, with FIG. 9C being a conversion example for color difference (Cb) and FIG. 9D showing a conversion example for color difference (Cr). In the drawings, dotted lines are a conversion example at a normal position where emphasis processing is not carried out, and solid lines show a conversion example for the case where the suppression operation that was shown in FIG. 7A-FIG. 7C has been carried out.

The above described color difference conversion is respectively carried out on a Cb signal and a Cr signal that have been converted by matrix computation from an RGB signal by the color difference signal calculating section 105f, using knee conversion and table conversion etc.

In this way, with this embodiment, first adjustment for adjusting so as to displace white balance in a hue direction designated by the user is carried out by the white balance processing section 105c. Also, second adjustment for adjusting saturation of image data is either carried out by the color difference signal calculating section 105f, or carried out by both the color difference signal calculating section 105f and the white balance processing section 105c.

Next, a hue and saturation adjustment operation of this embodiment will be described using the flowchart shown in FIG. 10. This flowchart is executed by the microcomputer 107 controlling respective sections within the camera, in accordance with programs stored in the flash memory 114.

Figure 10:
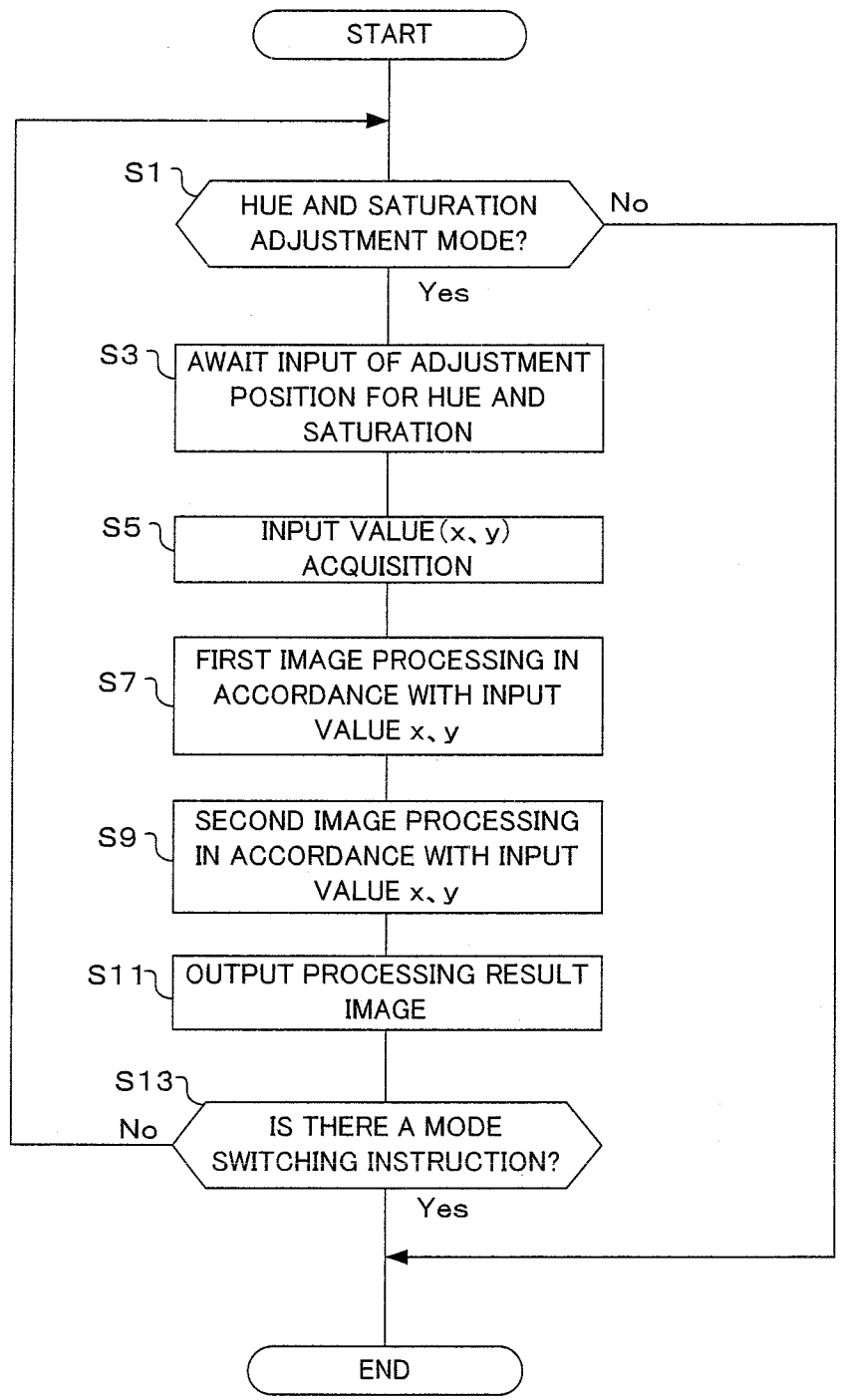
FIG. 10 is a flowchart showing operation of hue and saturation adjustment with the camera of one embodiment of the present invention.

If the flow shown in FIG. 10 is entered, it is first determined whether it is hue and saturation adjustment mode (S1). Hue and saturation adjustment mode can be set by the user operating the operation section 113. If the result of this determination is that hue and saturation adjustment mode has not been set, this flow is terminated.

If the result of determination in step S1 is that hue and saturation adjustment mode has been set, input of hue and saturation adjustment position is awaited (S3). Here, the operation section UI for hue and saturation adjustment that was shown in FIG. 3 is displayed on the LCD 116, and an operation of the hue and saturation designation pointer 15 by the user in order to adjust hue and saturation is awaited.

Once an adjustment position for hue and saturation has been input in step S3, next input values (x, y) are acquired (S5). Here, the position of the hue and saturation designation pointer 15 that has been moved by the user (x, y) is input. For example, with the example shown in FIG. 5 position B (x2, y2) is acquired, with the example shown in FIG. 6A position C (x3, y3) is acquired, and with the example shown in FIG. 7A position D (x4, y4) is acquired.

Once an input value (x, y) has been input, next first image processing is carried out in accordance with the input value (x, y) (S7). The first image processing is image processing for executing first adjustment for adjusting so as to displace white balance in a hue direction that has been designated by the user. Here, image processing is carried out by the white balance processing section 105c in accordance with position of the first adjustment axis 18 that has been designated by the user.

Once the first image processing has been carried out in step S7, next second image processing is carried out in accordance with the input value (x, y) (S9). Second image processing is image processing to execute second adjustment for adjusting saturation of image data designated by the user. Here, image processing is carried out by either the color difference calculating section 105f only, or by both the white balance processing section 105c and the color difference calculating section 105f, in accordance with position on the second adjustment axis 19 that has been designated by the user.

Once the second image processing has been carried out in step S9, next a processed result image is output (S11). Here, the processed result image is displayed on the LCD 116 on the basis of image data that has been subjected to image processing by the image processing section 105. Also, besides display on the LCD 116, image data that has been subjected to image processing externally may be output by means of communication section, not illustrated.

Once the processed result image has been output, it is next determined whether or not there is a mode switching instruction (S13). Here, whether or not setting of the hue and saturation adjustment mode has been canceled is determined based on operating state of the operation section 113 etc. If the result of this determination is that there is not a mode switching instruction, step S1 is returned to, and if a new hue and saturation adjustment value is input the previously described hue and saturation adjustment is executed. On the other hand, if the result of determination in step S13 is that there is a mode switching instruction, this flow is terminated.

As has been described above, one embodiment of the present invention is provided with a designation section (for example the operation section 113) for designating adjustment amount using the first adjustment axis 18 for carrying out first adjustment so as to displace white balance in a hue direction designated by the user, and the second adjustment axis 19 for carrying out second adjustment for adjusting saturation of the image data that has had white balance adjusted with the first adjustment axis, for image data, and the image processing section 105 for applying first image processing corresponding to the first adjustment to the image data, and applying second image processing corresponding to the second adjustment to the image data that has been subjected to the first image processing, with the second image processing being changed depending on the first image processing. Specifically, a second adjustment to adjust saturation of image data (refer to FIG. 6-FIG. 6C and FIG. 7A-FIG. 7C) is changed in accordance with the first adjustment to displace white balance in a hue direction (refer to FIG. 5A and FIG. 5B). This embodiment is therefore suited to carrying out creative color representation in line with the user's intentions.

Also, with the one embodiment of the present invention the image processing section 105 is further provided with an auto white balance calculation section (for example the white balance gain calculation section 105b) for calculating white balance gain corresponding to an adjustment result of the first adjustment on the basis of auto white balance calculation result suited to a light source color, and the first image processing is carried out by carrying out white balance processing to apply this calculated white balance gain to image data. Specifically, with this embodiment hue adjustment is carried out by the white balance processing section 105c. Since a white balance processing section is provided in a commonly used camera, creative color representation that changes hue in line with the user's intention becomes possible without providing a new image processing section.

Also, with the one embodiment of the present invention, the image processing section 105 carries out second image processing such that a variation amount for color difference signals for normal positions of the second adjustment axis 19 in the second adjustment becomes largest in a hue direction that has been designated by the user for the first adjustment. Specifically, after hue adjustment, saturation is adjusted in accordance with white balance gain. Emphasis is carried out for the designated hue, but emphasis is not carried out for hue in the complementary color direction, which means that it is possible to carry out processing for saturation in line with the user's intentions.

Also, with the one embodiment of the present invention, the image processing section 105, when emphasizing saturation more than normal positions (P11-P14) of the second adjustment axis 19 in the second adjustment, calculates white balance gain in accordance with adjustment position on the second adjustment axis, in a direction of higher saturation for the hue that has been designated by the first adjustment axis 18 than white balance gain calculated in accordance with the first adjustment. The image processing section 105 then carries out white balance processing with this calculated white balance gain, and also carries out second image processing so that amount of variation of color difference signals for normal positions of the second adjustment axis 19 become largest in a hue direction that has been designated with the first adjustment axis. Specifically, after hue adjustment, saturation is adjusted in accordance with white balance (refer to FIG. 8, and S9 in FIG. 10).

Also, with the one embodiment of the present invention, the image processing section 105 carries out second image processing, for the second adjustment, such that in a direction of suppressing saturation more than normal positions of the second adjustment axis 19 (P11-P14), a variation amount for saturation for normal positions becomes smallest in a hue direction that has been designated by the user for the first adjustment (refer to FIG. 7B). Therefore, since, with only slight saturation control, the designated hue retains tone, it is possible to carry out processing for saturation in line with the user's intentions.

Also, with the one embodiment of the present invention, the image processing section 105 carries out second image-processing, for the second adjustment, such that in a direction of suppressing saturation more than normal positions of the second adjustment axis 19 (P11-P14), a variation amount for color difference signals for normal positions of the second adjustment axis becomes smallest in a hue direction that has been designated by the user for the first adjustment (refer to FIG. 7A-FIG. 7C).

Also, the one embodiment of the present invention is provided with an imaging section for forming a subject image to acquire image data (for example the image sensor 102), and the monitor for displaying the image data (for example the LCD 116), with image data being displayed on this monitor at the time of live view display together with a circular map display (for example the operation section UI shown in FIG. 3) having a cursor capable of movement in the circumferential direction and the radial direction (for example the pointer 15), with the first adjustment axis 18 being for adjusting hue by moving the cursor in a circumferential direction, and the second adjustment axis 19 being for adjustment of saturation by moving the cursor in a radial direction. By carrying out this type of circular map display, it is possible to carry out adjustment of hue and saturation that is intuitively easy to understand.

Also, an image processing method of one embodiment of the present invention comprises a step of designating an adjustment amount using a first adjustment axis for carrying out first adjustment to adjust image data so as to displace white balance in a hue direction that has been designated by the user, and using a second adjustment axis for carrying out second adjustment to adjust saturation of the image data that has had white balance adjusted by the first adjustment axis (S3 and S5 in FIG. 10), a step of applying first image processing corresponding to a first adjustment to image data (S7), and a step of applying second image processing corresponding to the second adjustment to the image data that has been subjected to the first image processing, and in this case, changing the second image processing depending on the first image processing (S9).

In the one embodiment of the present invention, the user designation of adjustment of hue and saturation is carried out by performing a touch operation on a touch panel of the operation section 113, but this is not limiting, and it is also possible to move the pointer 15 using a cross shaped button or the like, so as to designate this position.

Also, with the one embodiment of the present invention position designated by the pointer 15 is input using Cartesian coordinates (x, y), but this is not limiting, and it is possible to input with another coordinate system, such as using polar coordinates comprising radius information and declination information for a radial direction (r, θ). In the case where a polar coordinate system is used, the first image processing is processing in accordance with declination information θ, and the second image processing is processing in accordance with radius information r.

Also, with one embodiment of the present invention first hue is adjusted and next saturation is adjusted, but it is also possible to have an operation flow where saturation is adjusted first followed by adjustment of hue. Regardless of the order of operations, in accordance with the position that has been designated by the user (x, y) first image processing is applied and then second image processing is carried out.

Also, with the one embodiment of the present invention, the circular map display as shown in FIG. 3 has been used as the operation section UI for hue and saturation adjustment. However, this is not limiting, and the first adjustment axis 18 and the second adjustment axis may be orthogonal. In this case, the first adjustment axis 18 is an indicator for adjustment of hue, and the second adjustment axis is an indicator for adjustment of saturation.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. The present invention can be applied to any device that is capable of adjusting hue and saturation.

Also, the image processing device is not limited to being incorporated into a camera, and may be a device that does not have an imaging section, such as a device dedicated to playback of images. In this case, when playing back an image hue and saturation are adjusted for display, and adjusted image data may be stored.

Also, an example has been described where some parts of the overall processing are processed as software by the microcomputer 107, and other parts of the overall processing are processed in hardware, but this is not limiting, and it is possible to have all of the processing as software processing or of the processing as hardware processing.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing device comprising:
a designation section for designating adjustment amounts, using a first adjustment axis for carrying out first adjustment of adjusting image data so as to displace white balance in a hue direction that a user has specified, and a second adjustment axis for carrying out second adjustment to adjust saturation for image data that has had white balance adjusted by the first adjustment axis, using processing including a white balance processing, and
an image processing section for applying first image processing corresponding to the first adjustment to the image data, and applying second image processing corresponding to the second adjustment to the image data that has been subjected to the first image processing, wherein
the image processing section changes the second image processing in accordance with the first image processing, and wherein,
the image processing section is further provided with an auto white balance calculation section for calculating white balance gain corresponding to adjustment result of the first adjustment on the basis of auto white balance calculation result suited to a light source, and the first image processing is carried out by carrying out white balance processing to apply the calculated white balance gain to the image data.

2. The image processing device of claim 1 wherein,
the image processing section carries out the second image processing so that in the second adjustment, in a direction of emphasizing saturation more than normal positions of the second adjustment axis, a variation of amount for saturation for the normal positions becomes largest in the hue direction that has been designated by the user with the first adjustment, and becomes smallest in the direction of a complementary color to the designated hue direction.

3. The image processing device of claim 2 wherein,
the image processing section, for the second adjustment, calculates white balance gain in accordance with adjustment position of the second adjustment axis, in a direction in which saturation for hue direction that has been designated by the first adjustment axis becomes larger than white balance gain calculated in accordance with the first adjustment, in a direction of emphasizing saturation more than normal positions of the second adjustment axis, carries out white balance processing with the calculated white balance gain, and also carries out second image processing so that amount of variation of color difference signals for normal positions of the second adjustment axis becomes smallest in a hue direction that has been designated with the first adjustment axis.

4. The image processing device of claim 1 wherein,
the image processing section carries out the second image processing so that in the second adjustment, in a direction of suppressing saturation more than normal positions of the second adjustment axis, a variation in amount of saturation for the normal positions becomes smallest in the hue direction that has been designated by the user with the first adjustment.

5. The image processing device of claim 4, wherein
the image processing section carries out the second image processing so that in the second adjustment, in a direction of suppressing saturation more than normal positions of the second adjustment axis, a variation amount for color difference signals for the normal positions becomes smallest in the hue direction that has been designated by the user with the first adjustment.

6. The image processing device of claim 1 wherein,
the image processing section comprises a first white balance calculation section for calculating a first white balance gain appropriate to the light source, a second white balance calculating section for calculating a white balance adjustment coefficient corresponding to adjustment positions of the first adjustment axis, and a third white balance calculation section for multiplying the first white balance gain by the white balance adjustment coefficient, and the image processing section carries out auto white balance calculation.

7. An imaging device, comprising:
an imaging section for forming a subject image and generating image data;
a monitor for displaying the image data;
a designation section for designating adjustment amounts, using a first adjustment axis for carrying out first adjustment of adjusting image data so as to displace white balance in a hue direction a user has specified, and a second adjustment axis for carrying out second adjustment to adjust saturation for image data that has had white balance adjusted by the first adjustment axis using processing including a white balance processing, and
an image processing section for applying first image processing corresponding to the first adjustment to the image data, and applying second image processing corresponding to the second adjustment to the image data that has been subjected to the first image processing, wherein
the image processing section changes the second image processing in accordance with the first image processing, and wherein,
the image processing section is further provided with an auto white balance calculation section for calculating white balance gain corresponding to adjustment result of the first adjustment on the basis of auto white balance calculation result suited to a light source, and the first image processing is carried out by carrying out white balance processing to apply the calculated white balance gain to the image data.

8. The imaging device of claim 7, wherein:
the monitor, for live view display,
displays the first adjustment axis and the second adjustment axis orthogonal to each other, together with the image data, the first adjustment axis being an indicator for adjustment of hue, and the second adjustment axis being an indicator for adjustment of saturation.

9. The imaging device of claim 7, wherein:

the monitor, for live view display, displays a circular map display having a cursor capable of movement in a circumferential direction and a radial direction, together with the image data, the first adjustment axis being for adjusting hue by moving the cursor in a circumferential direction, and the second adjustment axis adjusting saturation by moving the cursor in a radial direction.

10. An image processing method, for adjusting hue and saturation, comprising:

a step of designating an adjustment amount using a first adjustment axis for carrying out first adjustment to adjust image data so as to displace white balance in a hue direction that has been designated by the user, and using a second adjustment axis for carrying out second adjustment to adjust saturation for the image data that has had white balance adjusted by the first adjustment axis using processing including a white balance processing, a step of applying first image processing corresponding to a first adjustment to image data, and a step of applying second image processing corresponding to the second adjustment to the image data that has been subjected to the first image processing, and changing the second image processing depending on the first image processing wherein, the step of applying first image processing includes calculating white balance gain corresponding to adjustment result of the first adjustment on the basis of auto white balance calculation result suited to a light source, and the step of applying first image processing is performed by performing white balance processing to apply the calculated white balance gain to the image data.

11. A non-transitory computer-readable medium storing a computer program for controlling a computing device to adjust hue and saturation, the computer program comprising:

a step of designating an adjustment amount using a first adjustment axis for carrying out first adjustment to adjust image data so as to displace white balance in a hue direction that has been designated by the user, and using a second adjustment axis for carrying out second adjustment to adjust saturation for the image data that has had white balance adjusted by the first adjustment axis using processing including a white balance processing, a step of applying first image processing corresponding to a first adjustment to image data, and a step of applying second image processing corresponding to the second adjustment to the image data that has been subjected to the first image processing, and changing the second image processing depending on the first image processing wherein, the step of applying first image processing includes calculating white balance gain corresponding to adjustment result of the first adjustment on the basis of auto white balance calculation result suited to a light source, and the step of applying first image processing is performed by performing white balance processing to apply the calculated white balance gain to the image data.

* * * * *